United States Patent Office 3,726,869
Patented Apr. 10, 1973

3,726,869
5,6,7,8 - TETRAHYDRO-8-(2-MORPHOLINOETHYL)-
5 - OXO-2-PHENYLPYRIDO[2,3-d]PYRIMIDINE-6-
CARBONITRILE
Arthur A. Santilli, Havertown, and Dong H. Kim, Wayne, Pa., assignors to American Home Products Corporation, New York, N.Y.
No Drawing. Original application Aug. 14, 1968, Ser. No. 752,485, now Patent No. 3,641,027, dated Feb. 8, 1972. Divided and this application Apr. 23, 1971, Ser. No. 136,997
Int. Cl. C07d 87/44
U.S. Cl. 260—247.5 B          1 Claim

ABSTRACT OF THE DISCLOSURE

The disclosure is directed to 5,6,7,8-tetrahydro-8-(2-morpholinoethyl)-5-oxo - 2 - phenylpyrido[2,3-d]pyrimidine-6-carbonitrile which has central nervous system activity as a depressant.

This application is a division of our application Ser. No. 752,485, filed Aug. 14, 1968, which issued as Pat. No. 3,641,027 on Feb. 8, 1972. The entire contents of the specification of that patent are incorporated herein by reference.

This invention relates to 5,6,7,8-tetrahydro-8-(2-morpholinoethyl)-5-oxo - 2 - phenylpyrido[2,3-d]pyrimidine-6-carbonitrile which has central nervous system activity as a depressant.

What is claimed is:
1. 5,6,7,8-tetrahydro-8-(2-morpholinoethyl) - 5 - oxo-2-phenylpyrido[2,3-d]pyrimidine-6-carbonitrile.

No references cited.

DONALD G. DAUS, Primary Examiner
J. TOVAR, Assistant Examiner